May 20, 1930.  C. BIRDSEYE  1,759,682
METHOD OF PREPARING COMSUMER PACKAGES
Filed June 24, 1929
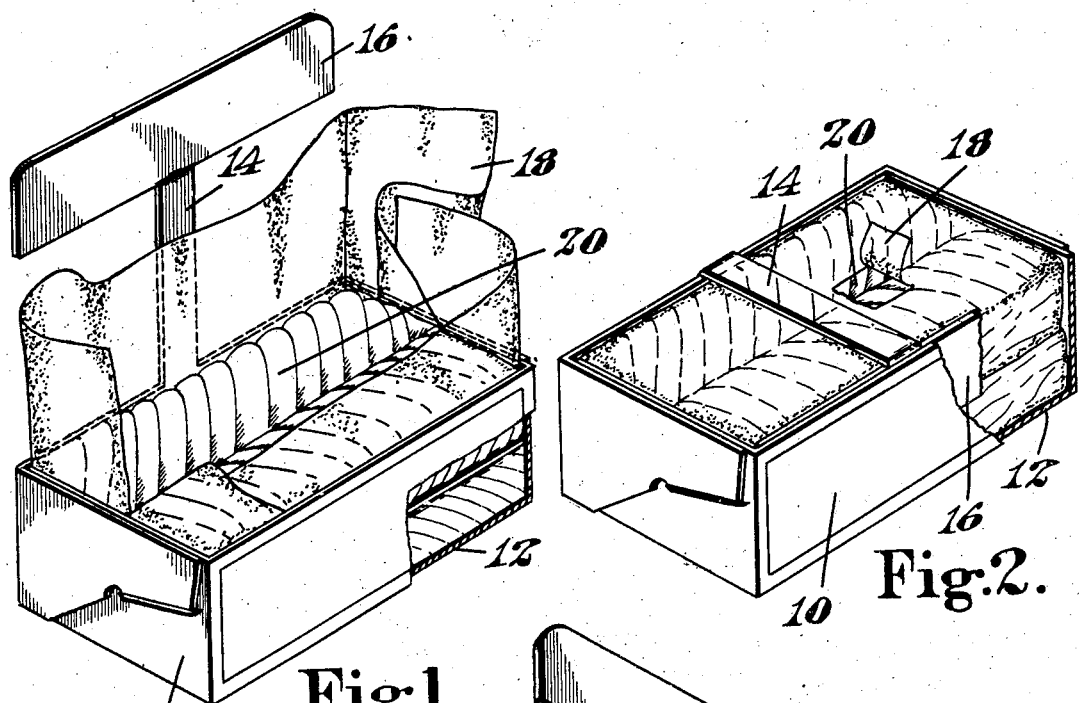
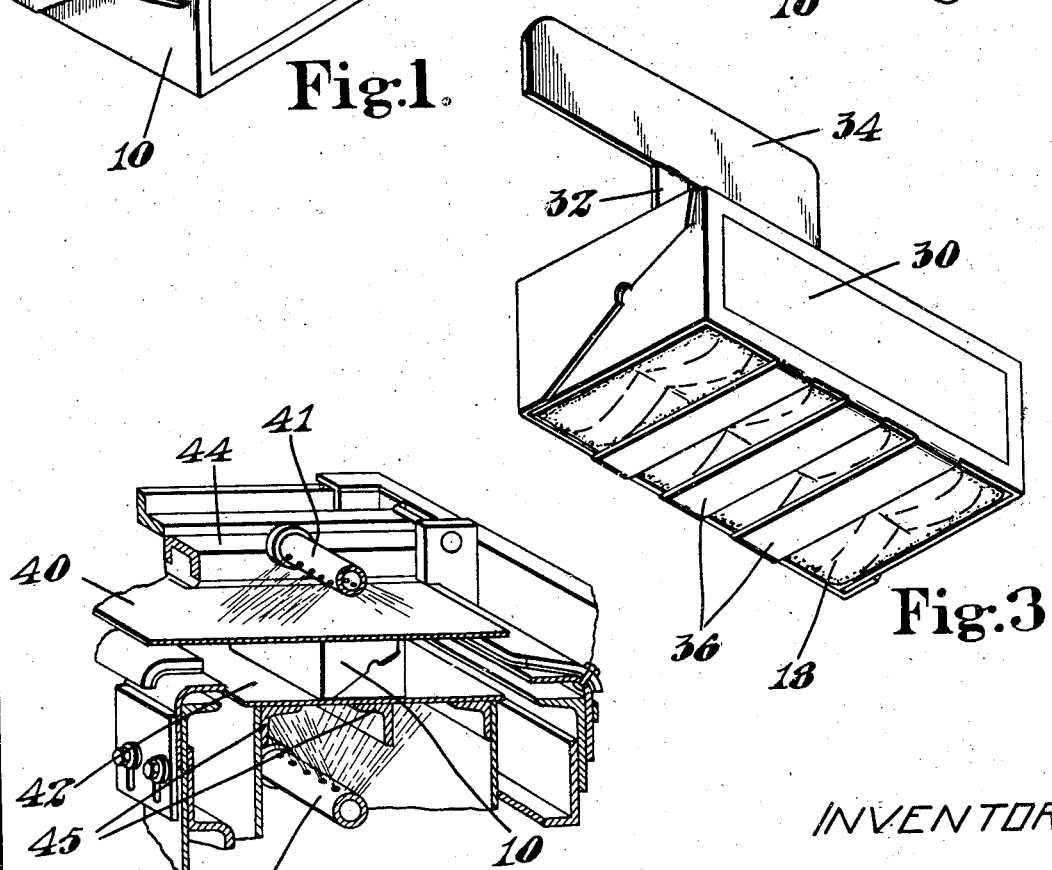
INVENTOR
Clarence Birdseye.
by H. W. Kenway, Atty Patented May 20, 1930

1,759,682

UNITED STATES PATENT OFFICE

CLARENCE BIRDSEYE, OF GLOUCESTER, MASSACHUSETTS, ASSIGNOR, BY MESNE ASSIGNMENTS, TO FROSTED FOODS COMPANY, INC., OF DOVER, DELAWARE, A CORPORATION OF DELAWARE

METHOD OF PREPARING CONSUMER PACKAGES

Application filed June 24, 1929. Serial No. 373,277.

This invention relates to methods of preparing consumer packages of perishable food products, and more particularly to such methods as are characterized by a freezing step.

My invention is concerned with the important and difficult problems of packaging in unit quantities fresh perishable food products such, for example, as fish, meat, fruit or vegetables, and in accomplishing this without loss of the essential characteristics of the fresh foodstuff, protecting it against desiccation and deterioration from both internal and external sources, and adapting it to be transported, stored and distributed to the consumer without impairment in any of these particulars.

My invention may be practiced most advantageously when it includes as one characteristic step the quick-freezing of the product. The process of quick-freezing, as will be understood, preserves fresh food substances in general, and notably fresh meat or fish, in substantially its fresh condition without deterioration in the mechanical construction of its tissue, substantially lessening autolysis, putrefaction and oxidation, preserving the vitamin content and eliminating loss of savory and nutritive constituents when the product is thawed. In one important aspect, my invention consists in preparing a consumer package of quick-frozen product in such fashion as to achieve the results above set forth and at the same time facilitate the quick-freezing step.

In carrying out my invention, I first pack the fresh product, which is usually in a moist pliable condition, within walls adequate to form it into a defined solid shape while leaving one or more faces substantially unconfined. The mass or body of the product thus formed is then enclosed within a pellicle or thin flexible skin, which serves to protect the product against contamination and oxidation and makes of it a self-contained unit. By employing for the pellicle a moisture and vapor-proof material, such for example as moisture-proof cellophane, the product is also guarded against desiccation and since such material is transparent the product may be critically inspected at all times without disturbing its wrapping. I then press the thin pellicle into intimate contact with the body of the formed product by engaging it over a substantial area directly with a flat heat-conductive member. Finally, the enclosed body is quick-frozen through the agency of the heat-conductive member which acts with particular rapidity and efficiency in that it is separated from the product to be frozen only by the very slight thickness of the pellicle which itself is not of heat-insulating character. Moreover, on account of its flexible character, the pellicle permits the enclosed product to flatten and conform itself against the face of the heat-conductive member so that practically complete surface contact is ensured and this contributes to the efficiency of the quick-freezing operation.

I will now, for purposes of illustration, proceed to describe the manner in which the method of my invention may be carried out in preparing consumer packages of fresh fish, the steps of the method being illustrated in the accompanying drawings, in which Fig. 1 is a view in perspective of a lined carton packed with fresh fish and ready for closing;

Fig. 2 is a view in perspective of the closed carton, with portions broken away;

Fig. 3 is a view in perspective showing a packed carton of modified form; and

Fig. 4 is a view in perspective showing the packed carton in position for quick-freezing between the heat-conductive member of a refrigerating apparatus.

In preparing a consumer package of fresh fish by the method of my invention, I preferably employ a cardboard carton 10 having a bottom 12. This has vertical walls of sufficient strength to contain the fresh moist fish 20 and to impart to it a definite rectilinear solid shape. The carton may be of any commercial type except that its cover is cut away leaving only a narrow strap 14 which is connected to the flap 16, adapted to be tucked in behind the front wall of the carton.

The carton is first lined with a very thin sheet material 18, such for example as moisture-proof cellophane, and then the fish 20 in the form of separate pieces or fillets is packed within the lined carton. This foodstuff is moist and pliable so that it packs together and conforms to the walls of the carton with a minimum of waste space. Having completed the packing, the cellophane lining 18 is folded down over the contents, forming a substantially moisture-proof and vapor-proof enclosure. The cover strap 14 is then folded down and the flap 16 tucked into place, as indicated in Fig. 2, completing the closing of the carton. In this figure, the cellophane lining 18 is represented as having a small flap torn in it but this is for purposes of illustration only and it will be understood that the packed fish is practically hermetically sealed against loss of moisture or contact with vapor by the cellophane.

In Fig. 3 is shown a carton 30 similar to that already described, except that its bottom panel is formed as a series of straps 36 which expose a substantial area of the cellophane lining 18. The carton 30 is provided with a top, comprising a single strap 32 connected to a flap 34, which is tucked behind the front wall of the carton when the latter is closed.

Having packed the carton, it is next placed between heat-conductive members, such as the metallic bands 40 and 42, of such refrigerating apparatus as that disclosed in my copending application, Serial No. 290,976, filed July 7, 1928. In that apparatus the lower band 42 is supported by guides 45 for movement in a predetermined path while the upper heat-conductive member 40 is pressed into engagement with the carton 10 by weights 44, one of which is shown. The bands are both refrigerated to a temperature approximately $-45°$ F. by spray pipes 41 and 43, which deliver to the outer faces of the bands a spray of calcium chloride brine or other suitable liquid refrigerating medium.

In presenting the carton 10 between the heat-conductive bands 40 and 42, the cellophane lining 18 is directly engaged wherever it is exposed in the carton. For example, in the carton 10 the entire upper surface of the cellophane is directly engaged except the portion beneath the narrow strap 14. In handling a carton such as the carton 30, shown in Fig. 3, the upper surface of the cellophane 18 is similarly engaged while its lower surface is engaged throughout the areas between the narrow bands 36 of the carton bottom. The result is that the thin flexible transparent pellicle is pressed into intimate contact with the packed fish and that the latter is flattened at its opposite sides into close conformity to the opposed surfaces of the heat-conductive bands. In this way, an extremely favorable condition for quick-freezing is brought about as intimate contact of the product and the heat-conductive bands over a substantial area is ensured. Moreover, the material of the pellicle is extremely thin and being a fair conductor of heat offers negligible resistance to the absorption of heat from the product by the heat-conductive bands.

The carton with its contents thus shaped between the heat-conductive bands, is thereafter quick-frozen into a solid brick, the freezing action taking place simultaneously from opposite sides. In actual practice, it has been found that a carton 2" thick may be frozen completely in not over 20 minutes under the conditions above outlined. The pellicle 18 is transparent and when flattened and pressed against the contents of the carton it becomes almost invisible, so that the contents may be critically inspected without in any way destroying the integrity of the package.

The quick-frozen package produced in accordance with my invention is solid and hard and the packages may be handled, stored and transported like so many bricks. While the temperature of the carton emerging from the quick-freezing apparatus is approximately $-45°$ F., it may be maintained indefinitely in storage at any temperature below its thawing point and, as already pointed out, during such interval it is substantially protected from desiccation by the moisture-proof character of its enveloping pellicle.

I have described the method of my invention as practiced in connection with cartons cut away so as to expose the contents thereof at its upper or lower faces but it will be understood that the location of the exposed pellicle-covered face of the product is of secondary importance only and may occur wherever it is best suited to the requirements of the particular product and carton to be employed.

My invention also includes within its scope the novel form of consumer package herein disclosed as prepared by the novel method of my invention.

Having thus described my invention, what I claim as new and desire to secure by Letters Patent is:

1. The method of preparing consumer packages of a perishable food product, which consists in enclosing the product in a container having walls to shape the product and a surface presenting a substantial area of thin flexible pellicle, and then freezing the product, while so shaped and confined, by contact of a heat-conductive member coextensive with its pellicle-covered area.

2. The method of preparing consumer packages of a perishable food product, which consists in enclosing the product in a moist pliable condition in a carton having vertical walls for shaping the product and upper and lower surfaces cut away in substantial areas, covering the product with a thin pellicle where it is exposed at such cut away areas, and then freezing the product while so confined by contact of heat-conductive members over its pellicle-covered areas.

3. The method of preparing consumer packages of a fresh food product, which consists in forming the product into a substantially rectangular body, covering portions of its superficial area with a thin transparent pellicle, and quick-freezing the rectangular body into a hard brick by intimately engaging the same over its pellicle-covered areas with flat heat-conductive members.

4. The method of preparing consumer packages of a fresh moist food product, which consists in lining with cellophane a carton having intact vertical walls and partially cut away top and bottom, filling the lined carton with the product and shaping the contents to the interior of the carton so that it is completely enclosed by the cellophane lining, confining the filled carton between heat-conductive members which directly engage said cellophane lining, and finally quick-freezing the contents of the carton by absorbing its heat principally through its cellophane-covered surfaces.

5. The method of preparing consumer packages of perishable food product, which consists in shaping the product into a brick by packing it within vertical walls, covering its upper and lower surfaces with a thin pellicle, pressing said pellicle into intimate contact with the shaped product by engaging it directly upon opposite sides by heat-conductive members, and quick-freezing the interposed article through the agency of said heat-conductive members.

6. The method of preparing consumer packages of perishable food product, which consists in shaping the product into a brick by packing it within vertical walls without substantially confining its upper and lower faces, completely enclosing the shaped product within a thin pellicle, pressing the pellicle into intimate contact with the shaped product upon its upper and lower faces by engaging it directly between flat heat-conductive members, and simultaneously quick-freezing it.

7. The method of preparing consumer packages of fresh fish, which consists in forming a rectangular mass of moist pliable fish by packing pieces thereof within a carton having vertical walls which surround the mass without substantially confining its upper face, completely enclosing the formed mass in moisture-proof cellophane, pressing the cellophane into intimate contact with the upper face of the mass by engaging it directly by a flat heat-conductive member, and simultaneously quick-freezing the carton and enclosed mass into a solid brick.

8. A consumer package comprising a solid frozen brick of fresh food product completely enclosed in a thin transparent substantially moisture-proof pellicle flattened into intimate contact with opposite sides thereof and frozen thereto, and a carton having side walls which encase the brick and a top and bottom with openings to expose its upper and lower pellicle-covered surfaces.

CLARENCE BIRDSEYE.